United States Patent [19]

Elfert et al.

[11] 4,059,580

[45] Nov. 22, 1977

[54] SULPHONATED POLYBENZ-1,3-OXAZIN-2,4-DIONES

[75] Inventors: Klaus Elfert; Jürgen Hinz; Rudolf Binsack, all of Krefeld, Germany

[73] Assignee: Bayer Aktiengesellschaft, Germany

[21] Appl. No.: 713,143

[22] Filed: Aug. 10, 1976

[30] Foreign Application Priority Data

Aug. 16, 1975 Germany ............................... 2536491

[51] Int. Cl.$^2$ .................. C07D 265/00; C07D 273/00; C07D 295/00; C08F /00
[52] U.S. Cl. .................................. 544/73; 260/47 CB
[58] Field of Search ....................... 260/246 R, 47 CB

[56] References Cited

U.S. PATENT DOCUMENTS

| 3,444,136 | 5/1969 | Belohlav et al. ................ 260/47 CB |
| 3,510,454 | 5/1970 | Bottenbruch et al. ........... 260/47 CB |
| 3,541,048 | 11/1970 | Binsack et al. .................. 260/47 CB |
| 3,657,186 | 4/1972 | Craven ............................ 260/47 CB |

OTHER PUBLICATIONS

Basic Principles of Org. Chem.—Roberts & Caserio–W. A. Benjamin, Inc.-New York-pp. 798-799, (1965).

Primary Examiner—Albert T. Meyers
Assistant Examiner—D. W. Robinson
Attorney, Agent, or Firm—Connolly and Hutz

[57] ABSTRACT

Novel, sulphonated polybenz-1,3-oxazin-2,4-diones are produced by reacting polybenzoxazin diones with chlorosulphonic acid in a molar ratio of from 1:1 to 1:10.

4 Claims, No Drawings

SULPHONATED POLYBENZ-1,3-OXAZIN-2,4-DIONES

This invention relates to novel, sulphonated polybenz-1,3-oxazin-2,4-diones and to a process for their production.

Polybenz-1,3-oxazin-2,4-diones and their production are known from German Patent Specification No. 1,495,839 and from German Offenlegungsschrifts No. 1,595,579; corresponding to U.S. Pat. No. 3,379,686 and from German Offenlegungsschrifts Nos. 1,595,579; 1,720,774; 2,232,462; 2,232,463 and 2,232,467 corresponding to U.S. Pat Nos. 3,510,454, 3,541,048, GB Pat. No. 1,393,470 and U.S. Pat. No. 3,839,283. These polymers are distinguished by their outstanding resistance to high temperatures.

Unfortunately, the poor solubility of these polymers, even in highly polar solvents, makes them unsuitable for numerous applications requiring temperature-resistant plastics, for example the production of films of uniform thickness for insulating electric motors or cables. Another disadvantage is the poor adhesion of these polybenzoxazin diones to silicate surfaces such as, for example, glass.

It has now surprisingly been found that these disadvantages can be overcome by sulphonating the polybenzoxazin diones.

Accordingly, the present invention relates to sulphonated polybenz-1,3-oxazin-2,4-diones having the recurring structural unit:

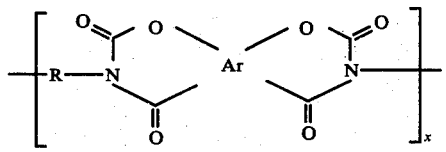

in which R represents a radical corresponding to the general formula (I) or (II):

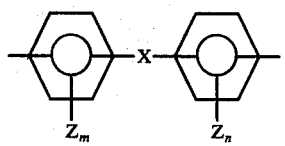

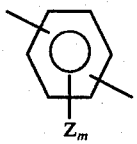

where X is a bond or a bridge member of the formula —O—, —S—, —SO$_2$—, —C(CH$_3$)$_2$— or —CH$_2$—; Ar represents a radical corresponding to the general formulae (III)-(V):

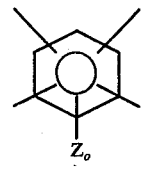

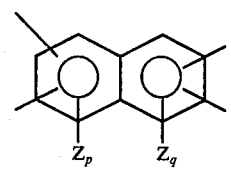

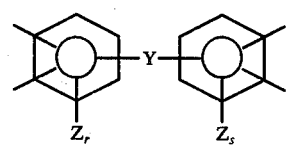

Y is a bond or a bridge member of the formula —O—, —S—, —CH$_2$—, —SO$_2$— or —CO—; Z is an —SO$_3$H-group or a sulphonic acid salt of an alkali or alkaline earth metal or of an organic amine; $m$, $n$, $o$, $p$, $q$, $r$, and $s$ can be the same as or different from one another and $m$ and $n$ represent an integer from 0 to 4, $o$, $p$, and $q$ represent an integer from 0 to 2, and $r$ and $s$ represent an integer from 0 to 3; with the proviso that $m$, $n$, $o$, $p$, $q$, $r$ and $s$ cannot be 0 simultaneously; and $x$ represents an integer from 10 to 200. The sulphonated polybenzoxazin diones according to the invention have an acid number of from 1 to 800, preferably from 5 to 500 and, with particular preference, from 5 to 250.

The sulphonated polybenzoxazin diones according to the invention are characterised by a relative viscosity $\eta_{rel}$, measured on a 0.5% solution in dimethyl formamide at 25° C, of from 0.7 to 3.5. Their molecular weights $M_n$, as measured by the osmotic method (in m-cresol), are in the range of from 5000 to 100,000.

These new sulphonated polybenzoxazin diones are obtained by sulphonating the corresponding polybenzoxazin diones which are obtained, for example, by reacting di-o-hydroxyaryl dicarboxylic acid esters with diisocyanates or the corresponding carbamic acid esters in accordance with the following reaction scheme:

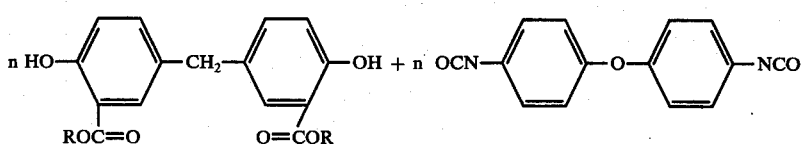

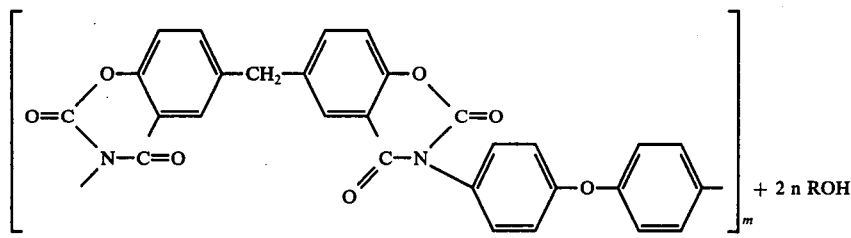

(R = alkyl, cycloalkyl or aryl), m = 10 − 200.

Diaryl esters, especially diphenyl esters, of the following bis-o-hydroxy aryl carboxylic acids are preferably used in this process: 2,5-dihydroxy terephthalic acid, 4,6-dihydroxy isophthalic acid, 3,6-dihydroxy-o-phthalic acid, 4,4'-dihydroxy diphenyl-3,3'-dicarboxylic acid, 4,4'-dihydroxy diphenyl ether-3,3'-dicarboxylic acid, 4,4'-dihydroxy-5,5'-dimethyl diphenyl methane-3,3'-dicarboxylic acid, 1,1-(4,4'-dihydroxy-5,5'-dimethyl-3,3'-dicarboxydiphenyl)-ethane, 1,5-dihydroxy naphthalene-2,6-dicarboxylic acid, 5,5'-carbonyl-bis-(salicyclic acid), 5,5'-thio-bis-(salicyclic acid), 5,5'-sulphone-bis-(salicyclic acid) or mixtures thereof.

Diisocyanates which may be used for the reaction are, for example, hexamethylene-1,6-diisocyanate, tolylene-2,4-diisocyanate, diphenyl methane-4,4'-diisocyanate, diphenyl-2,2-propane-4,4'-diisocyanate, naphthalene-1,5-diisocyanate, diphenyl sulphide-4,4'-diisocyanate, benzophenone-4,4'-diisocyanate, diphenyl ether-4,4'-diisocyanate, diphenyl ether-2,4-diisocyanate, diphenyl ether-2-methoxy-4,4'-diisocyanate, diphenylsulphone-4,4'-diisocyanate, 1,4-bis-(4-isocyanatophenoxy)-benzene, 1,3-bis-(4-isocyanatophenoxy)-benzene, bis-[(4-isocyanatophenyldimethyl)-methyl]-benzene, naphthalene-1,5-diisocyanate or mixtures thereof.

The polycondensation reaction which gives high molecular weight polybenz-1,3-oxazin-2,4-diones may be carried out in the presence or in the absence of solvents. The polycondensation reaction is preferably carried out in an aprotic, highly polar solvent such as, for example N,N-dimethyl formamide, N,N-dimethyl acetamide, N,N,N',N'-tetramethyl urea, N,N,N',N', N'',N''-hexamethyl phosphoric acid triamide, tetramethylene sulphone, diphenyl sulphoxide or dimethyl sulphoxide, The aprotic, highly polar solvents may also be used in admixture with one another or in conjunction with other aprotic, less polar solvents such as, for example, benzene, toluene, chlorobenzene, methylene chloride, carbon tetrachloride or dioxane. The preferred solvent is dimethyl sulphoxide, the polycondensation reaction taking place smoothly and quickly in this solvent.

The polycondensation may be carried out at temperatures in the range of from 20° to 200° C, the preferred temperature range being from 80° to 120° C.

The polycondensation reaction is accelerated by the catalytic effect of tertiary amines such as, for example, triethyl amine, tripropyl amine, pyridine, N,N-dimethyl aniline, quinoline, N-methyl morpholine, 1,4-diazabicyclo-[2,2,2]-octane or 1,3-diazaadamantane. The catalytically active amine is used in a concentration of from 0.01 to 2% and preferably in a concentration of from 0.05 to 0.3% by weight.

Since in many cases the polybenz-1,3-oxazin-2,4-diones are soluble in the reaction medium, the progress of the polycondensation reaction may be followed from the increase in viscosity. The reaction is substantially complete when there is no further increase in viscosity.

Sulphonation of the polybenzoxazin diones is characterised by the fact that the polybenzoxazin diones are reacted with chlorosulphonic acid in the presence of halogenated hydrocarbons.

Preferred hydrocarbons are halogenated aliphatic hydrocarbons with $C_1$ to $C_4$, such as methylene chloride, chloroform, dichloroethylene and tetrachlorethane.

The reaction is carried out at temperatures in the range of from −20° C to the boiling point of the solvent.

The concentration of the reactants is determined by the ratio of polybenzoxazin dione to chlorosulphonic acid which is governed by the required degree of sulphonation. In general, a molar ratio of polybenzoxazin dione to chlorosulphonic acid of from 1:1 to 1:10, preferably from 1:1 to 1:5, is used.

Processes for the sulphonation of aromatic compounds are known per se. They are described, for example, in the chapter entitled "Methoden zur Herstellung aromatischer Sulfonsauren" (Methods for Producing Aromatic Sulphonic Acids) in Houben-Weyl, Methoden der organischen Chemie, Vol IX. However, it had not been expected that polybenzoxazin diones would lend themselves to sulphonation in this way without losing their film-forming properties.

The polybenzoxazin diones according to the invention are highly soluble in strongly polar solvents and are therefore eminently suitable for the production of films and sheeting resistant to high temperatures.

EXAMPLE a. 14.7 g of a polybenz-1,3-oxazin-2,4-dione having the following structure:

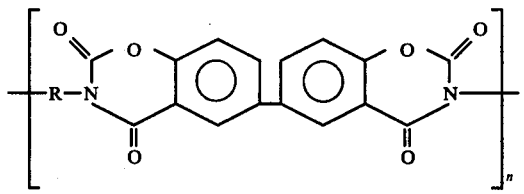

in which R represents a phenylene ether radical of the formula:

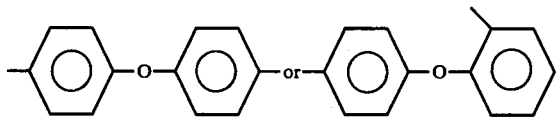

the two phenylene ether radicals being present in a molar ratio of 8 : 2, are swelling under reflux for 2 hours in 200 ml of methylene chloride. After cooling to −5° C, 7 g of chlorosulphonic acid in 20 ml of methylene chloride are added over a period of one hour at that temperature. The mixture is allowed to return to room temperature and is then heated under reflux for 1 hour. The product is filtered off under suction, washed with methanol and suspended in water. The product is isolated and dried at 50° C in a vacuum drying cabinet. 15.1 g of a sulphonated polybenzoxazin dione are obtained. The polymer has a relative viscosity $\eta_{rel}$ of 1.441 (the relative viscosities were measured at 25° C on solutions of 5 g of polymer in 1 liter of dimethyl formamide) and a sulphonic acid content of 0.15 mole of —$SO_3H$ per structural unit.

b. A 15% solution of the polymer obtained as described in (a) in dimethyl acetamide is prepared and cast onto a glass plate in a layer thickness of 250μ. By evaporating the solvent at 70° to 100° C, the solution forms a transparent film which adheres firmly to the glass plate.

What we claim is:

1. A sulphonated polybenz-1,3-oxazin-2,4-dione whose 0.5% solution in dimethyl formamide at 25° C has a relative viscosity of from 0.7 to 3.5 and which has an acid number of from 1 to 800 of the formula

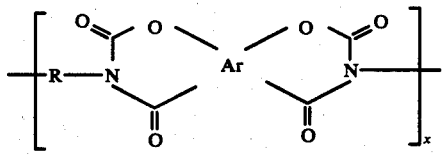

wherein R is

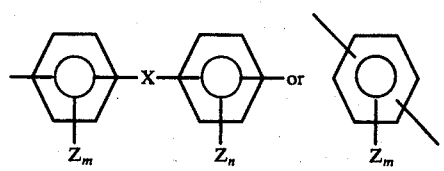

and Ar is of the formula

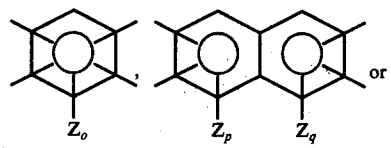

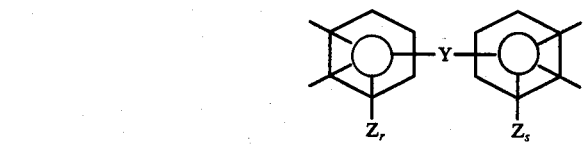

wherein X is a bond, —O—, —S—, —$SO_2$—, —C($CH_3$)$_2$— or —$CH_2$—; Y is a bond, —O—, —S—, —$CH_2$—, —$SO_2$— or —CO—; Z is —$SO_3H$ or a radical of a sulphonic acid salt of an alkali or alkaline earth metal; $m$, $n$, $o$, $p$, $q$, $r$ and $s$ are the same or different, and $m$ and $n$ represent 0 or an integer from 1 to 4, $o$, $p$ and $q$ represent 0, 1 or 2, and $r$ and $s$ represent 0 or an integer from 1 to 3; with the proviso that $m$, $n$, $o$, $p$, $q$, $r$ and $s$ cannot all be 0 simultaneously; and $x$ is an integer of from 10 to 200.

2. The sulphonated polybenz-1,3-oxazin-2,4-dione of claim 1, having an acid number of from 5 to 500.

3. The sulphonated polybenz-1,3-oxazin-2,4-dione of claim 1, having an acid number of from 5 to 250.

4. A film or sheet of the sulphonated polybenz-1,3-oxazin-2,4-dione of claim 1.

* * * * *